United States Patent [19]

Maclin et al.

[11] Patent Number: 4,807,433
[45] Date of Patent: Feb. 28, 1989

[54] TURBINE COOLING AIR MODULATION

[75] Inventors: Harvey M. Maclin; Dean T. Lenahan, both of Cincinnati; Tuley, Eugene N., Hamilton, all of Ohio

[73] Assignee: General Electric Company, Cincinnati, Ohio

[21] Appl. No.: 143,494

[22] Filed: Jan. 13, 1988

Related U.S. Application Data

[63] Continuation of Ser. No. 491,839, May 5, 1983, abandoned.

[51] Int. Cl.⁴ .............................................. F02C 7/12
[52] U.S. Cl. ................................... 60/39.29; 415/115
[58] Field of Search ............... 60/39.29; 415/115, 116, 415/117; 416/95

[56] References Cited

U.S. PATENT DOCUMENTS

| | | | |
|---|---|---|---|
| 3,565,545 | 2/1971 | Bobo et al. | 415/115 |
| 3,575,528 | 4/1971 | Beam, Jr. | 416/97 |
| 3,584,458 | 6/1971 | Wetzler | 415/115 |
| 3,635,586 | 1/1972 | Kent et al. | 416/97 |
| 3,712,756 | 1/1973 | Kalikow et al. | 415/175 |
| 3,742,706 | 7/1973 | Klompas | 415/115 |
| 3,826,084 | 7/1974 | Branstrom et al. | 415/115 |
| 3,972,181 | 8/1976 | Swayne | 415/115 |
| 4,213,738 | 7/1980 | Williams | 416/95 |
| 4,217,755 | 8/1980 | Williams | 415/115 |
| 4,236,869 | 12/1980 | Laurello | 416/95 |
| 4,275,990 | 6/1981 | Langley | 416/95 |
| 4,296,599 | 10/1981 | Adamson | 415/115 |
| 4,332,133 | 6/1982 | Schwarz et al. | 415/115 |
| 4,416,111 | 11/1983 | Lenahan et al. | 415/115 |
| 4,447,190 | 5/1984 | Campbell | 415/115 |
| 4,462,204 | 7/1984 | Hull | 415/115 |

FOREIGN PATENT DOCUMENTS

| | | | |
|---|---|---|---|
| 2010404 | 6/1979 | United Kingdom | 415/117 |
| 2057573 | 4/1981 | United Kingdom | 415/117 |
| 2081392 | 2/1982 | United Kingdom | 416/95 |

OTHER PUBLICATIONS

CF6-80 Engine Technical Review, vol. I, Feb. 1979, General Electric Figure "9844299", and Figure 040-279).

U.S. application Ser. No. 401,173, filed Jul. 23, 1982, (13LN-1579), Peter R. Hull.

U.S. application Ser. No. 238,257, filed Feb. 25, 1981, (13DV-7732), Dean T. Lenahan et al.

Primary Examiner—Stephen C. Bentley
Attorney, Agent, or Firm—Francis L. Conte; Steven J. Rosen; Derek P. Lawrence

[57] ABSTRACT

Disclosed are a cooling air modulation apparatus for and method of operation for a gas turbine engine which are effective for increasing engine operating efficiency. According to one embodiment of the invention, the apparatus includes a first inducer means effective for channeling a first portion of cooling air to a rotor component during both first and second modes of operation of the engine. A second inducer means is also provided and is effective for channeling a second portion of the cooling air to the rotor component. Valve means are provided for selectively modulating the amount of cooling air flowing through the second inducer for preventing flow therethrough during the first mode of operation and for allowing unrestricted flow therethrough during the second mode of operation.

14 Claims, 2 Drawing Sheets

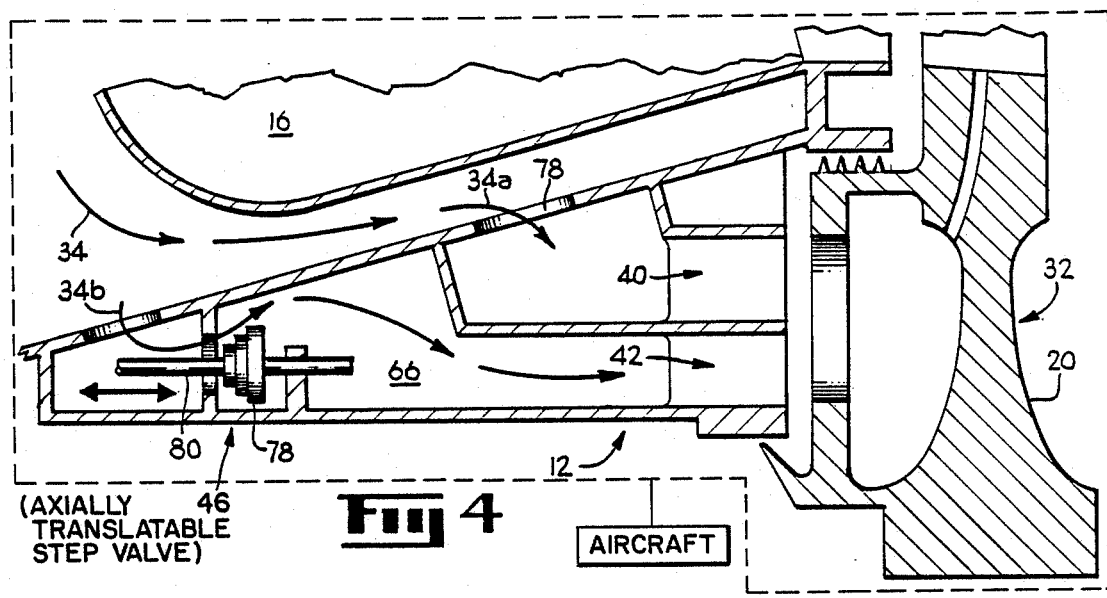
Fig 4 (AXIALLY TRANSLATABLE STEP VALVE)
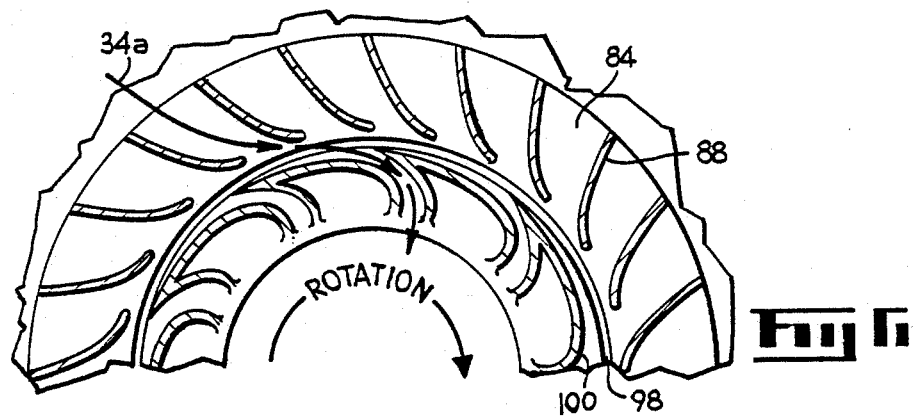
Fig 6
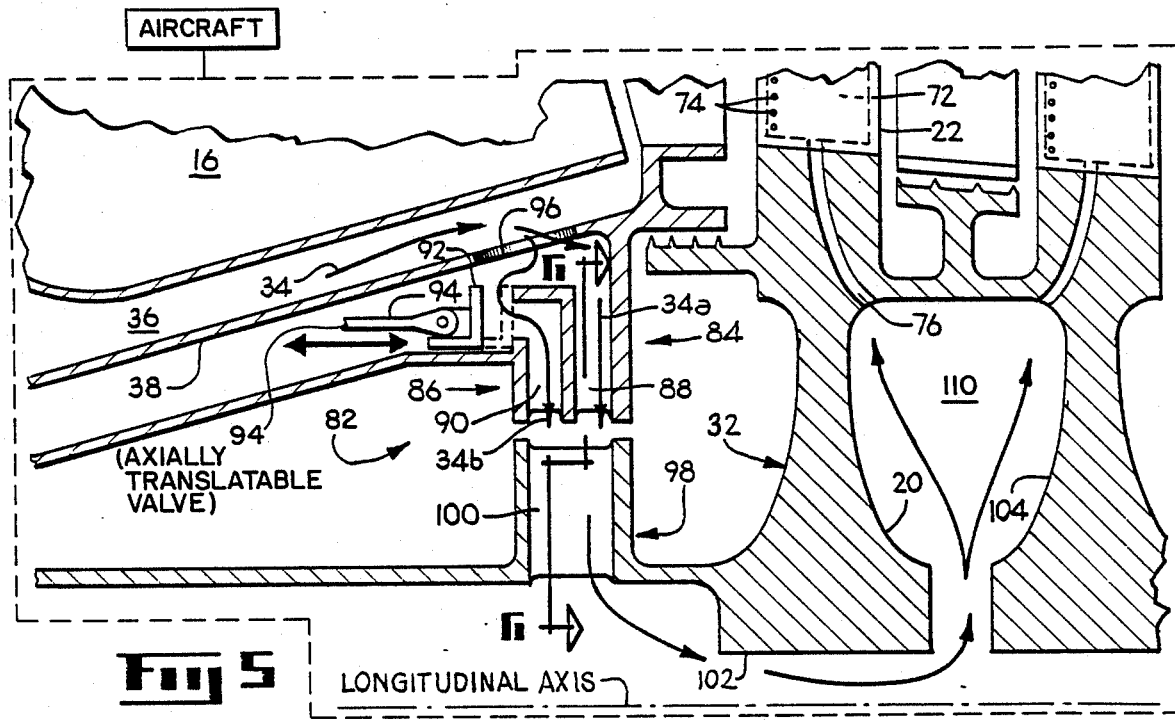
Fig 5 (AXIALLY TRANSLATABLE VALVE)

TURBINE COOLING AIR MODULATION

The invention herein described was made in the course of or under a contract or subcontract thereunder with the United States Department of the Air Force.

This is a continuation of application Ser. No. 491,839, filed May 5, 1983, now abandoned.

FIELD OF THE INVENTION

This invention relates generally to gas turbine engines and, more particularly, to means for modulating cooling airflow to hot rotor components thereof.

BACKGROUND OF THE INVENTION

Gas turbine engines typically include cooling systems for limiting the temperatures experienced by relatively hot rotor components such as, for example, turbine blades. The turbine blades extract work from hot combustion gases and, therefore, typically include internal cavities and cooling air apertures through the walls thereof through which relatively cool compressor discharge air is channeled for cooling the blades. The cooling air must be provided at suitable pressures and flow rates for adequately cooling the turbine blades and maintaining acceptable backflow margin. Backflow margin is defined as the difference between the cooling air pressure inside the blade and the pressure of the hot combustion gases which flow over the blades. It is preferable that a positive backflow margin be maintained so that combustion gases are not ingested through the apertures and into the blades, which might lead to a reduction in blade life.

The cooling air is typically provided by diverting a portion of the compressor discharge air into the cooling system. However, energy losses and a net reduction in engine thermal efficiency results when any compressor air is diverted from its intended purpose for combustion. The prior art includes many turbine cooling systems, including systems which modulate by throttling the amount of cooling air required in accordance with the various modes of operation of an engine. However, although prior art cooling systems provide for cooling of rotor components, they do so at different levels of efficiency.

SUMMARY OF THE INVENTION

Accordingly, an object of the present invention is to provide a new and improved cooling air modulation system for a gas turbine engine.

Another object of the present invention is to provide a new and improved cooling air modulation system effective for more efficiently channeling cooling air to a rotor component under at least two modes of engine operation.

Another object of the present invention is to provide a new and improved cooling air modulation system requiring reduced amounts of total cooling air.

Another object of the present invention is to provide a new and improved cooling air modulation system effective for maintaining at least a preferred minimum positive backflow margin.

Disclosed are a cooling air modulation apparatus for and method of operation of a gas turbine engine which are effective for increasing engine operating efficiency. According to one embodiment of the invention, the apparatus includes a first inducer means effective for channeling a first portion of cooling air to a rotor component during both first and second modes of operation of the engine. A second inducer means is also provided and is effective for channeling a second portion of the cooling air to the rotor component. Valve means are provided for selectively modulating the amount of cooling air flowing through the second inducer for preventing flow therethrough during the first mode of operation and for allowing unrestricted flow therethrough during the second mode of operation. The use of two inducer means in the turbine cooling air modulation apparatus allows for increased efficiency of an engine operating in more than one mode of operation.

BRIEF DESCRIPTION OF THE DRAWINGS

The invention, together with further objects and advantages thereof, is more particularly described in the following detailed description taken in conjunction with the accompanying drawings in which:

FIG. 4 is a sectional view of a cooling air modulation apparatus according to another embodiment of the present invention including a stepped valve means;

FIG. 5 is a sectional view of a cooling air modulation apparatus according to another embodiment of the present invention including radial inducer means; and FIG. 6 is a section view taken along line 6—6 in FIG. 5 illustrating radial inducer stator vanes and a deswirler.

DETAILED DESCRIPTION

Figure 1:
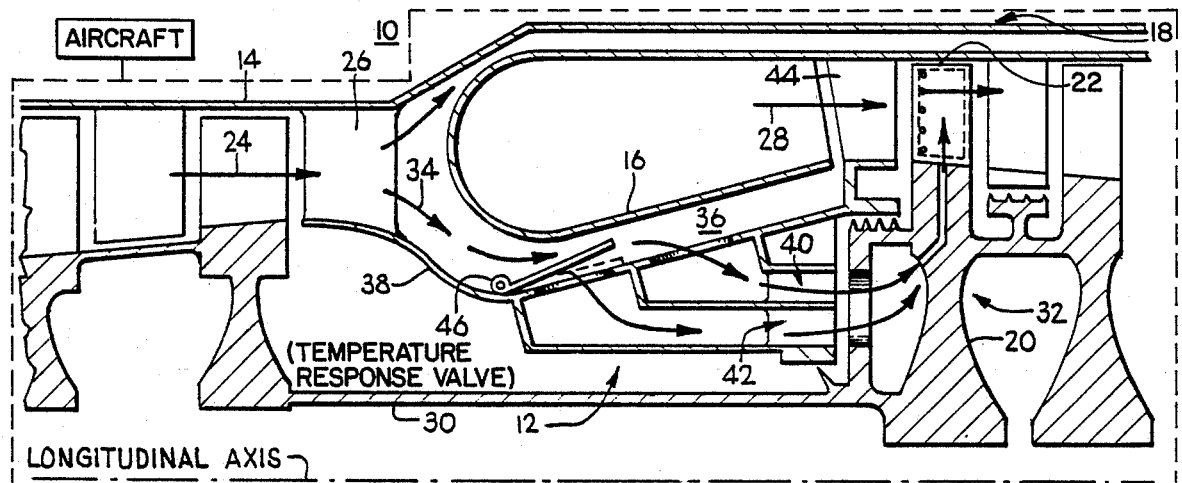
FIG. 1 is a sectional view of a portion of a gas turbine engine including a cooling air modulation apparatus according to one embodiment of the present invention.

Illustrated in FIG. 1 is an axial flow gas turbine engine 10 including an cooling air modulation apparatus, generally indicated at 12, according to one embodiment of the present invention. The engine 10 includes in serial flow relationship a compressor 14, a combustor 16, and a high pressure turbine 18 including a rotor disk 20 having a plurality of circumferentially spaced turbine blades 22 extending radially outwardly therefrom.

In conventional operation, inlet air 24 is pressurized by the compressor 14 and then passes through a diffuser 26. A major portion of the air 24 is then suitably channeled into the combustor 16 where it is mixed with fuel for generating relatively high pressure combustion gases 28 which flow to the high pressure turbine 18 for providing power to the compressor 14 through an interconnecting shaft 30. The combustion gases 28 then pass through a low pressure turbine (not shown), which provides power to a fan (not shown) and are then discharged from the engine 10.

The gas turbine engine 10 typically operates under various modes of operation. For example, the engine 10 can operate under first and second modes of operation which correspond with relatively low and high power output levels thereof, respectively. More specifically, the engine 10 may be provided for powering an aircraft under a first, cruise, mode of operation and a second, takeoff, mode of operation. During takeoff, the engine 10 is effective for generating relatively large thrust output as compared to a relative small amount of thrust output generated during cruise operation.

Inasmuch as the temperature of the combustion gases 28 is significantly higher during takeoff than during cruise, cooling air is typically provided for reducing the temperatures experienced by a relatively hot rotor component 32 which, for example, can include the rotor disk 20 and the turbine blades 22. However, for increasing the overall efficiency of the engine 10 during operation, cooling air must be efficiently channeled to the rotor component 32 and only in the amounts needed for the various modes of operation.

Examples of cooling arrangements operable at various levels of efficiency are disclosed in U.S. Pat. No. 4,296,599—A. P. Adamson; U.S. Pat. No. 3,742,706—N. N. Klompas; and U.S. Pat. No. 3,712,756—I. Kalikow et al, all assigned to the present assignee and incorporated herein by reference.

Figure 2:
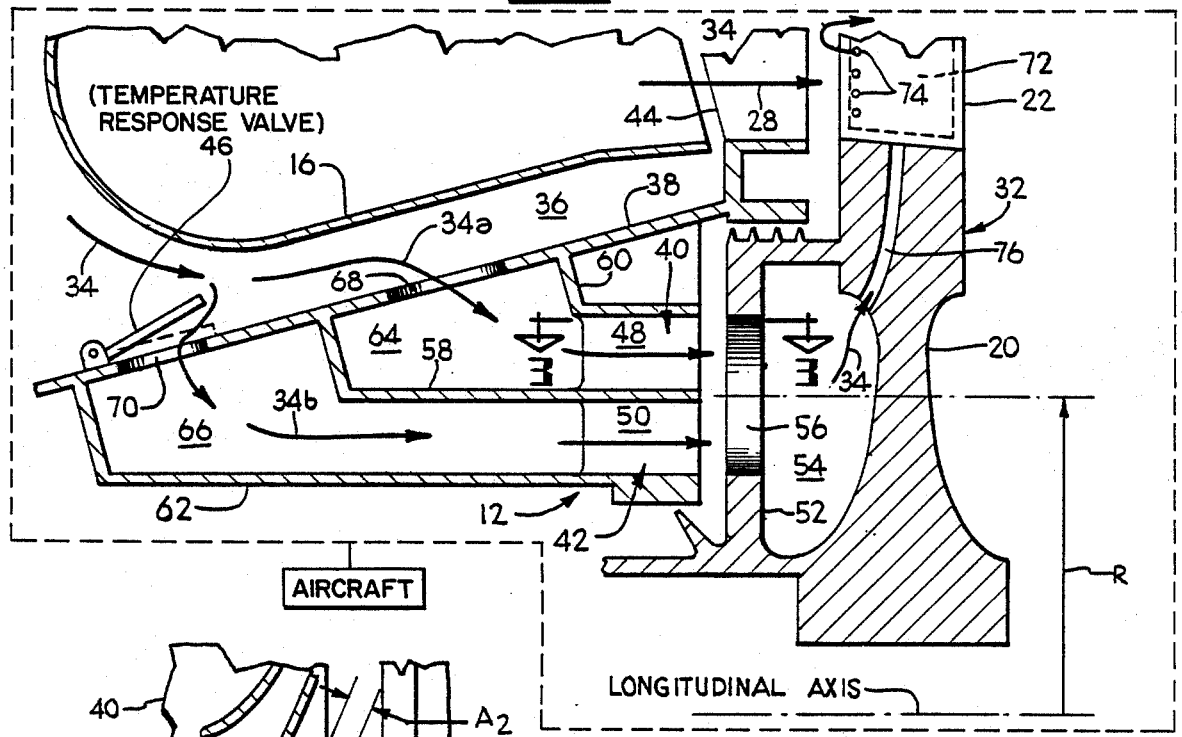
FIG. 2 is an enlarged sectional view of the cooling air modulation apparatus of FIG. 1.

The cooling air modulation apparatus 12 according to one embodiment of the present invention is illustrated in more particularity in FIG. 2. A portion of the pressurized inlet air 24 that is discharged from the compressor 14 (as shown in FIG. 1) is used for providing pressurized cooling air 34 to the modulation apparatus 12 for cooling the rotor component 32 heated by the combustion gases 28. The cooling air 34 is channeled to the modulation apparatus 12 by an annular inner duct 36 defined by an inner casing 38 and a casing of the combustor 16.

The modulation apparatus 12 according to one embodiment of the invention includes annular first and second inducer means 40 and 42, respectively, suitably secured to a stationary member, such as the inner casing 38 to which a turbine nozzle 44 is typically attached. The first and second inducers 40 and 42 are effective for independently channeling first and second portions, 34a and 34b, respectively, of the cooling air 34 to the rotor component 32. Suitable valve means 46 are also provided and are effective for selectively modulating the amount of the cooling air 34b flowing through the second inducer 42 for preventing flow therethrough during the first mode of operation and for allowing unrestricted flow therethrough during the second mode of operation. The cooling air 34a is allowed to flow without restriction through the first inducer 40 during all modes of operation including both the first and second modes. The use of two annular inducers, 40 and 42, are effective for reducing inlet distortion and excitation of rotor components by providing a substantially circumferentially uniform airflow into the inlet apertures 56.

It is known to those skilled in the art that an inducer, such as the first inducer 40 and the second inducer 42, can be optimally sized for most efficiently channeling a fixed amount of cooling air from a nonrotating component to a rotating component at, generally, only one engine mode of operation. Aerodynamic pressure losses have reduced values when the cooling air 34 is channeled to the rotor component 32 in a direction substantially tangential thereto and at a velocity substantially equal to a tangential velocity thereof while supplying the required flow with sufficient backflow margin to uniformly cool the rotor blades.

However, in order to modulate cooling air, known prior art arrangements utilize a single inducer sized at the second, high power mode for operation and provided with valve means for throttling down the flow of cooling air therethrough during the first, low power mode of operation. Undesirable pressure losses result from throttling the cooling air flow and also when the inducer is operated during the off design, first mode of operation.

According to one embodiment of the present invention pressure losses are reduced when two inducers, 40 and 42, are utilized. The first inducer 40 is sized for efficient operation during the first mode of operation and the second inducer 42 is sized to provide additional cooling air 34 during the second mode of operation. Throttling losses due to partially open valve means may be eliminated when the flow of cooling air 34b through the second inducer 42 is either prevented or unrestricted. These advantages and additional advantages resulting from the use of the modulation apparatus 12 are more partially described hereinafter.

The first and second inducers 40 and 42, which can alternatively be referred to as tangential flow accelerators, each includes a plurality of circumferentially spaced stator vanes 48 and 50, respectively. The stator vanes 48 and 50 of the first and second inducers 40 and 42, respectively, are preferably arranged and sized for channeling the cooling air 34 in a direction substantially tangential to the rotor component 32.

The rotor component 32 can also include an annular seal member 52 suitably joined to the rotor disk 20 for defining an annular manifold 54 therebetween. Seal member 52 includes a plurality of circumferentially spaced inlet apertures 56 disposed therein in flow communication with the manifold 54, which apertures 56 are effective for receiving the cooling air 34 from the first and second inducers 40 and 42. The inlet apertures 56 are disposed at a nominal radius R from a longitudinal, centerline axis of the engine 10 and are generally aligned with and spaced from the first and second inducers 40 and 42 for receiving the cooling air 34 therefrom.

Figure 3:
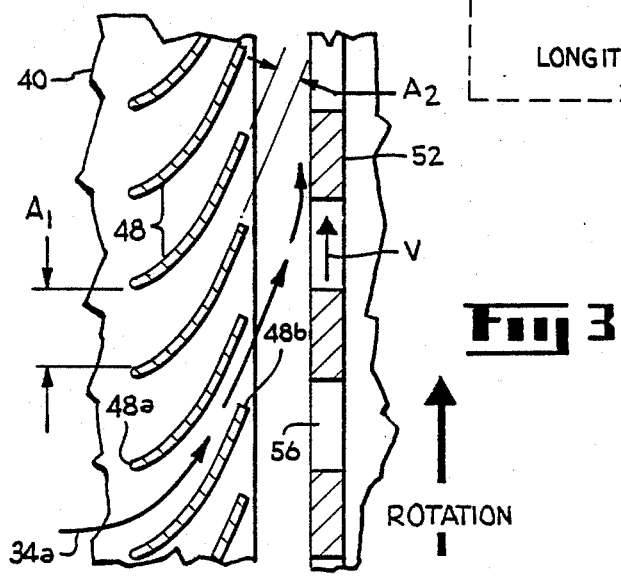
FIG. 3 is a sectional view taken along line 3—3 in FIG. 2 illustrating inducer stator vanes and the discharge of cooling air therefrom.

Illustrated in more particularity in FIG. 3 are the vanes 48 of the first inducer 40 and the annular seal member 52. During operation, the annular seal member 52 rotates and the inlet apertues 56 thereof have a tangential velocity V at the radius R. The vanes 48 of the first inducer 40 are conventionally arranged so that during the first mode of operation the cooling air 34a is directed in a direction substantially tangential to the annular seal member 52 of the rotor component 32. Furthermore, the vanes 48 are also conventionally sized for accelerating the cooling air 34a to a velocity substantially equal to the tangential velocity V of the inlet apertures 56 during the first mode of operation.

More specifically, the leading and trailing edges 48a and 48b, respectively of adjacent vanes 48 define inlet and outlet cross-sectional flow areas $A_1$ and $A_2$, respectively. The inlet flow area $A_1$ is suitably sized greater than the outlet area $A_2$ for suitably accelerating the cooling air 34a.

Similarly, stator vanes 50 of the second inducer 42 are conventionally sized so that during the second mode of operation the cooling air 34b also is channeled in a direction substantially tangential to the seal member 52 and accelerated to a velocity substantially equal to the tangential velocity V of the inlet apertures 56 of the seal member 52.

Referring again to FIG. 2, it will be noted that the first and second inducers 40 and 42 comprise axial flow inducers wherein the stator vanes 48 and 50 are disposed for directing cooling air 34 in a generally axial direction. The inducers 40 and 42 are coaxially disposed with the first inducer 40 disposed radially outwardly of the second inducer 42. The inducers 40 and 42 are separated by an annular partition member 58 which in cooperation with an annular radially outer wall 60 and an annular radially inner wall 62 define an annular first plenum 64 and an annular second plenum 66, respectively. The first and second plenums 64 and 66 include a plurality of circumferentially spaced first and second inlet apertures 68 and 70, respectively, which are effective for receiving the cooling air 34 from the compressor 14.

The first plenum 64 is effective for receiving without substantial restriction, i.e. pressure losses, the cooling air 34b through the unmodulated first inlet 68 and channeling the flow to the first inducer 40. The second plenum 66 is also effective for receiving without substantial restriction the cooling air 34b through the second inlet apertures 70 and channeling the cooling air 34b to the second inducer 42.

The valve means 46 can comprise any suitable valve means, such as a plurality of circumferentially spaced valve doors 46 each disposed with a respective inlet aperture 70 to collectively provide for the modulation of the cooling air 34b through the second plenum 66 and the second inducer 42. The valve means 46 can be actuated by suitable conventional means (not shown) in response to temperature of the combustion gases 28, pressure of the cooling air 34, rotational speed of the shaft 30 or any other suitable parameter indicating the various modes of operation of the engine 10. In the embodiment shown, the valve doors 46 are modulated between a closed position (illustrated in dashed line) that completely blocks the flow of cooling air 34b, and an open position (illustrated in solid line) that allows substantially unrestricted flow through the second inlets 70 and the second inducer 42.

In operation, the first and second inducers 40 and 42 of the modulation apparatus 12 are sized as above-described so that a suitable amount of cooling air 34 is provided only through the first inducer 40 to the rotor component 32 during the first, low power mode of operation. During this first mode of operation, the valve doors 46 are in a closed position preventing the flow of cooling air 34b through the second inducer 42. The first inducer 40 is sized not only to provide a sufficient quantity of cooling air 34a, but also to supply the cooling air 34a at a sufficient pressure for maintaining adequate backflow margin in the blades 22.

More specifically, the blades 22 of the rotor component 32 each includes an internal cavity 72 disposed in flow communication with a plurality of cooling air apertures 74 disposed through a wall thereof. The first and second inducers 40 and 42 are effective for channeling the cooling air 34 under pressure through the manifold 54 and through a conduit 76 disposed in the rotor disk 20 to the internal cavity 72, where the air is discharged from the blades 22 through the apertures 74. The apertures 74 are fixed orifices conventionally sized with the first inducer 40 for controlling the flow rate of the cooling air 34a therethrough and the backflow margin thereat during the first mode of operation.

During the second mode of operation, the valve means 46 are suitably opened for allowing the additional cooling air 34b to flow through the second inducer 42 and join with cooling air 34a flowing through the first inducer 40. The combined cooling air 34 discharged from the first and second inducers 40 and 42 provides an increased flow of cooling air 34. Inasmuch as apertures 74 are fixed in size, the additional flow of cooling air 34a and 34b is restricted from flowing through the apertures 74, thus increasing the backflow margin above the minimum obtained during the first mode of operation.

More specifically, the pressure of the cooling air 34 in the internal cavity 72 during the second mode of operation is greater than the pressure therein during the first mode of operation. Furthermore, the pressure therein is also greater than the pressure of the combustion gases 28 flowing over the blades 22 during both the first and second modes of operation.

Accordingly, the modulation apparatus 12 is effective for maintaining at least a preferred minimum positive backflow margin under all operating conditions of the engine 10 and thus ensures that cooling air 34 is continuously discharged through the apertures 74 for thereby preventing any ingestion of the combustion gases 28 into the blades 22.

It will be appreciated that providing a cooling air modulation apparatus 12 according to the present invention results in a system requiring reduced amounts of total cooling air channeled under increased efficiency with reduced pressure losses while maintaining adequate backflow margin during the various modes of operation. More specifically, the first inducer 40 is effective for efficiently providing only that much cooling air 34a required for cooling the rotor component 32 during the first mode of operation, e.g., cruise. During the high power mode of operation, such as the second mode of operation occurring during takeoff, additional cooling air 34b is efficiently provided through the second inducer 42 for increasing the total cooling air 34 required and increasing the backflow margin.

This arrangement and method of operation is more efficient than sizing a modulation apparatus for providing sufficient cooling airflow and backflow margin at the high power, second mode of operation and then reducing the amount of cooling flow and backflow margin for the low power, first mode of operation. This is due to the fact that in typical prior art modulation systems valve means are provided for throttling down the amounts of cooling airflow flowing through the system. Whenever pressurized air is allowed to throttle across a partially open valve means pressure, and therefore energy, is lost. Furthermore, when a cooling air system is designed primarily for a high power mode of operation and then throttled back for a low power mode of operation, the backflow margin is typically reduced below a minimum desired value thereby creating the possibility of gas flow ingestion into the blades 22.

As above-described, the valve means 46 are preferably positionable at open or closed positions for thus eliminating any throttling pressure losses which might otherwise occur if the valve means 46 were placed in an intermediate position. However, these throttling pressure losses may be outweighed in some situations, e.g. during aircraft climb mode of operation which typically represents a small percentage of engine operating time, where modulation of the cooling air 34b at an intermediate value is desirable.

More specifically, and for example, illustrated in FIG. 4 is an alternative arrangement of the modulation apparatus 12 and the valve means 46. In this embodiment, an axially translatable stepped valve 78 connected to a suitable actuation means (not shown) by a cable 80 is provided. A stepped valve 78 is effective for modulating the amount of cooling airflow 34b entering the second plenum 66 through open, intermediate and closed positions.

Illustrated in FIGS. 5 and 6 is a cooling air modulation apparatus 82 according to another embodiment of the present invention. The modulation apparatus 82 is similar to the modulation apparatus 12 illustrated in FIGS. 1-3. However, the modulation apparatus 82 includes first and second radial inducer means 84 and 86, respectively, which are effective for channeling cooling air 34 in a generally radial direction. The first and second inducers 84 and 86 each includes a plurality of circumferentially spaced radial flow stator vanes 88 and 90, respectively. The flow of cooling air 34b to the second inducer 86 is controlled by a suitable valve means 92 connected to a suitable actuation means (not shown) by a cable 94. The valve means 92 can comprise, for example, an annular slide valve member.

Cooling air 34 is channeled from the duct 36 through a plurality of circumferentially spaced apertures 96 disposed through the inner casing 38 to the first and second inducers 84 and 86. The rotor component 32 includes in this embodiment of the invention, an annular deswirler member 98 having a plurality of circumferentially spaced radial flow stator vanes 100 through which the cooling air 34 from the inducers 84 and 86 is channeled to a central bore 102 of the rotor disk 20. The cooling air 34 is then channeled through the central openings bore 102 in rotor disk 20 to a plenum 110 defined by the rotor disk 20 and an adjacent rotor disk and then to the conduit 76 communicating with the internal cavity 72 of the blades 22.

In operation, the modulation apparatus 82 illustrated in FIGS. 5 and 6 is sized and operates similarly to the modulation apparatus 12 of FIGS. 1-3. However, the modulation apparatus 82 is an alternative radial flow version of the axial flow modulation apparatus 12.

While there has been described herein what are considered to be preferred embodiments of the present invention, other embodiments will occur to those skilled in the art from the teachings herein. For example, more than two inducers may be used with the second and additional inducers including valve means. Furthermore, other types of inducers or tangential flow accelerators known to those skilled in the art, e.g. apertures or orifices, may also be used.

Accordingly, having thus described the invention, what is desired to be secured by Letters Patent of the United States is:

We claim:

1. For a gas turbine engine operable in first and second modes of operation and including a rotor component to be cooled, a compressor effective for providing pressurized cooling air, and a combustor effective for providing combustion gases, a cooling air modulation apparatus comprising:
   a first tangential flow accelerator effective for channeling a first portion of said cooling air in a substantially circumferentially uniform flow to an annular manifold in said rotor component during both said first and second modes of operation;
   a second tangential flow accelerator effective for channeling a second portion of said cooling air to said manifold; and
   a valve means effective for selectively modulating the amount of said second portion of cooling air flowing through said second tangential flow accelerator for preventing flow therethrough during said first mode of operation and flow allowing substantially unrestricted flow therethrough during said second mode of operation.

2. A cooling air modulation apparatus according to claim 1 wherein said first and second tangential flow accelerators each comprises a plurality of circumferentially spaced stator vanes effective for channeling said cooling air in a direction substantially tangential to said rotor component.

3. A cooling air modulation apparatus according to claim 2 wherein said stator vanes comprise axial flow stator vanes.

4. A cooling air modulation apparatus according to claim 2 wherein:
   said rotor component includes a cooling air inlet aperture, and in fluid communication with said manifold and disposed therein at a radius with respect to a longitudinal axis of said engine;
   said first tangential flow accelerator is effective for accelerating said first portion of said cooling air to a velocity substantially equal to a tangential velocity of said inlet during said first mode of operation.

5. A cooling air modulation apparatus according to claim 1 wherein said rotor component further comprises a plurality of circumferentially spaced turbine blades extending from a rotor disk, each of said blades including an internal cavity in fluid communication with said manifold effective for receiving said cooling air from said first and second tangential flow accelerators.

6. A cooling air modulation apparatus according to claim 5 wherein each of said turbine blades further includes a plurality of cooling air apertures disposed through walls thereof, said cooling air apertures being in flow communication with said internal cavity, said first and second tangential flow accelerators being effective for channeling cooling air under pressure to said cavity, whereby said pressure during said second mode of operation being greater than said pressure during said first mode of operation, and said pressure being greater than the pressure of the combustion gases during both of said first and second modes of operation.

7. A cooling air modulation apparatus according to claim 5 wherein said manifold includes an annular plenum and said rotor component further includes an annular seal member cooperating with said rotor disk for defining said annular plenum, said seal member including a plurality of circumferentially spaced inlet apertures disposed therein in flow communication with said plenum and being effective for receiving said cooling air from said first and second tangential flow accelerators; said plenum being effective for channeling said cooling air to said internal cavities in said blades.

8. A cooling air modulation apparatus according to claim 1 further including a second annular plenum wherein said first and second annular plenums are effective for collecting said cooling air from said compressor and directing said cooling air to said first and second tangential flow accelerators, respectively; and wherein said valve means is effective for modulating said cooling airflow to said second plenum.

9. A cooling air modulation apparatus according to claim 8 wherein said second plenum includes a plurality of circumferentially spaced inlet apertures and said valve means comprises a plurality of valve doors each disposed with a respective inlet aperture to collectively provide for modulation of cooling airflow to said second plenum.

10. A cooling air modulation apparatus according to claim 1 wherein said valve means is responsive to temperature of combustion gases.

11. A cooling air modulation apparatus according to claim 1 wherein said first and second modes of operation correspond with said engine operating at relatively low and high power levels, respectively.

12. A cooling air modulation apparatus according to claim 1 wherein said gas turbine engine is effective for powering an aircraft and said first and second modes of operation correspond with aircraft cruise and takeoff modes of operation, respectively.

13. For a gas turbine engine operable in first and second modes of operation and including a rotor component to be cooled and a compressor effective for providing pressurized cooling air, a method of modulating cooling air comprising the steps of:
channeling a first portion of said cooling air to an annular plenum in said rotor component during both said first and second modes of operation; and
channeling a second portion of said cooling air to said plenum during said second, and not during said first, mode of operation; and
channeling said first and second portions of cooling air substantially tangentially to said rotor component; and
channeling said cooling air to said plenum at a velocity substantially equal to a tangential velocity thereof; and
channeling said cooling air to said plenum with a substantially constant pressure profile and with a preferred minimum positive backflow margin.

14. A method of modulating cooling air according to claim 13, wherein said rotor component comprises a plurality of circumferentially spaced turbine blades each having an internal cavity and cooling air apertures through walls thereof, and wherein said backflow margin representing a difference between cooling air pressure in said internal cavity and combustion gas pressure at said cooling air apertures remains positive in value and has a higher value in said second mode of operation than in said first mode of operation.

* * * * *